United States Patent [19]
Tong

[11] Patent Number: 6,061,204
[45] Date of Patent: May 9, 2000

[54] CONTAMINANT SEALS FOR REMOVABLE DISK DRIVES

[75] Inventor: Simon Tong, San Francisco, Calif.

[73] Assignee: Iomega Corporation, Roy, Utah

[21] Appl. No.: 09/351,801

[22] Filed: Jul. 13, 1999

Related U.S. Application Data

[62] Division of application No. 08/980,937, Dec. 1, 1997.

[51] Int. Cl.[7] .................................................. G11B 33/14
[52] U.S. Cl. .......................................................... 360/97.04
[58] Field of Search ................................ 369/75.1, 75.2, 369/77.1, 77.2; 360/97.02, 97.04, 99.02, 99.06

[56] References Cited

U.S. PATENT DOCUMENTS

| | | | |
|---|---|---|---|
| 4,112,471 | 9/1978 | Pollard et al. | 360/133 |
| 4,607,301 | 8/1986 | Iizuka | 360/96.5 |
| 5,204,793 | 4/1993 | Plonczak | 360/97.01 |
| 5,282,100 | 1/1994 | Tacklind et al. | 360/97.02 |
| 5,530,603 | 6/1996 | Weidman et al. | 360/97.04 |
| 5,757,580 | 5/1998 | Andress et al. | 360/97.02 |
| 5,872,680 | 2/1999 | Patterson et al. | 360/97.02 |

*Primary Examiner*—David D. Davis
*Attorney, Agent, or Firm*—Woodcock Washburn Kurtz Mackiewicz & Norris LLP

[57] ABSTRACT

A removable media data storage drive with improved protection from ambient contamination is provided. A first foam strip covered with a strip of plastic, at the bottom of the opening in the front panel of the disk drive, seals the opening against contamination while the disk(s) are spinning and during insertion and removal of the media. A second foam strip, attached to the door of the disk drive, provides padding to the door and further seals the opening against contamination. A first plastic seal made out of plastic is attached to the removable disk drive covering the entire bottom portion of the drive. This seal (1) prevents extrinsic contamination from entering the removable disk drive through the gaps and openings on the bottom of the drive by acting as a barrier to blockade any airborne particles from being pulled into the negative pressurized areas of the drive, and (2) prevents shorting of any electrical components mounted on the bottom of the removable. A second plastic seal is positioned over the cartridge eject and head locking mechanism of the disk drive in order to prevent debris from entering the disk drive from this mechanism.

1 Claim, 4 Drawing Sheets

CONTAMINANT SEALS FOR REMOVABLE DISK DRIVES

This Application is a divisional of application Ser. No. 08/980,937 filed Dec. 1, 1997.

BACKGROUND OF THE INVENTION

1. Field of the Invention

This invention relates to a removable media data storage drive and more particularly to protecting such a data storage drive from contamination.

2. Description of the Prior Art

Removable disk cartridges for storing digital electronic information typically comprise an outer casing or shell that houses a rotatable recording medium, or disk, upon which electronic information can be stored. The cartridge shell houses one or more disks, which are mounted on a hub that freely rotate within the cartridge. When the cartridge is inserted into a disk drive, a motor-driven spindle in the drive must engage the hub in order to rotate the disk(s) within the cartridge.

U.S. Pat. No. 5,205,793, Apr. 20, 1993, Garold Plonczak, "Removable Cartridge Disk Drive with an Integral Head Loading Ramp, Air Filter and Removable Cartridge Door Safety Stop" relates to a removable cartridge disk drive with an integral head loading ramp, air filter and removable cartridge door safety stop. Air filters for reducing contamination are known.

U.S. patent application having Ser. No. 08/703,227, filed Sep. 6, 1996, entitled "Disk Drive Having A Seal To Eliminate Contamination" (Attorney's Docket IOM-9280) relates to the reduction of contamination. This invention reduces the reduction of particles inside a disk drive by sealing an opening that provides an access to a rotating flange on the outside of the drive to link it to a rotating lever on the inside of the drive.

There are still places, however, on and around removable disk drives through which foreign particles can permeate. Thus, it is desirable to provide a removable disk drive with improved protection against ambient contamination.

SUMMARY OF THE INVENTION

In accordance with the present invention, a removable media data storage drive has improved protection from ambient contamination.

A first foam strip, at the bottom of the opening in the front panel of the disk drive, seals the opening against contamination while the disk(s) are spinning and during insertion and removal of the media. The data storage drive has a door normally closing the opening to prevent contamination from entering the drive. The door has a hinge at the top thereof so that the bottom of the door can be opened by sliding the media over the foam strip and into the drive. A strip of plastic over the foam facilitates the sliding of the media over the strip of foam.

Further, in accordance with the invention, a second foam strip, attached to the door of the disk drive, provides padding to the door and seals the opening when the door is flush against the front panel, as when no cartridge is inside the drive. In an embodiment of the disk drive where the door remains open when a cartridge is inside the drive, the second foam strip presses against the top of the cartridge and seals the opening of the front panel, thereby preventing external contamination from entering the drive.

Further, in accordance with the invention, a rectangular plastic seal made out of plastic has adhesives laminated on its four edges. These four bands of adhesives are attached to the removable disk drive covering the entire bottom portion of the drive. This seal performs two functions. The primary function is to prevent extrinsic contamination from entering the removable disk drive through the gaps and openings on the bottom of the drive. The seal acts as a barrier to blockade any airborne particles from being pulled into the negative pressurized areas of the removable disk drive. Another function of the seal is to prevent shorting of any electrical components mounted on the bottom of the removable disk drive.

Further, in accordance with the invention, another plastic sheet is positioned over the cartridge eject and head locking mechanism of the disk drive in order to prevent debris from entering the disk drive from these components. The mechanism generates debris and an opening below the mechanism allows extrinsic contamination to enter the area of the mechanism.

The foregoing and other objects, features and advantages of the inventions will be understood from the following more detailed description and appended claims.

DETAILED DESCRIPTION OF THE PREFERRED EMBODIMENTS

Figure 1:
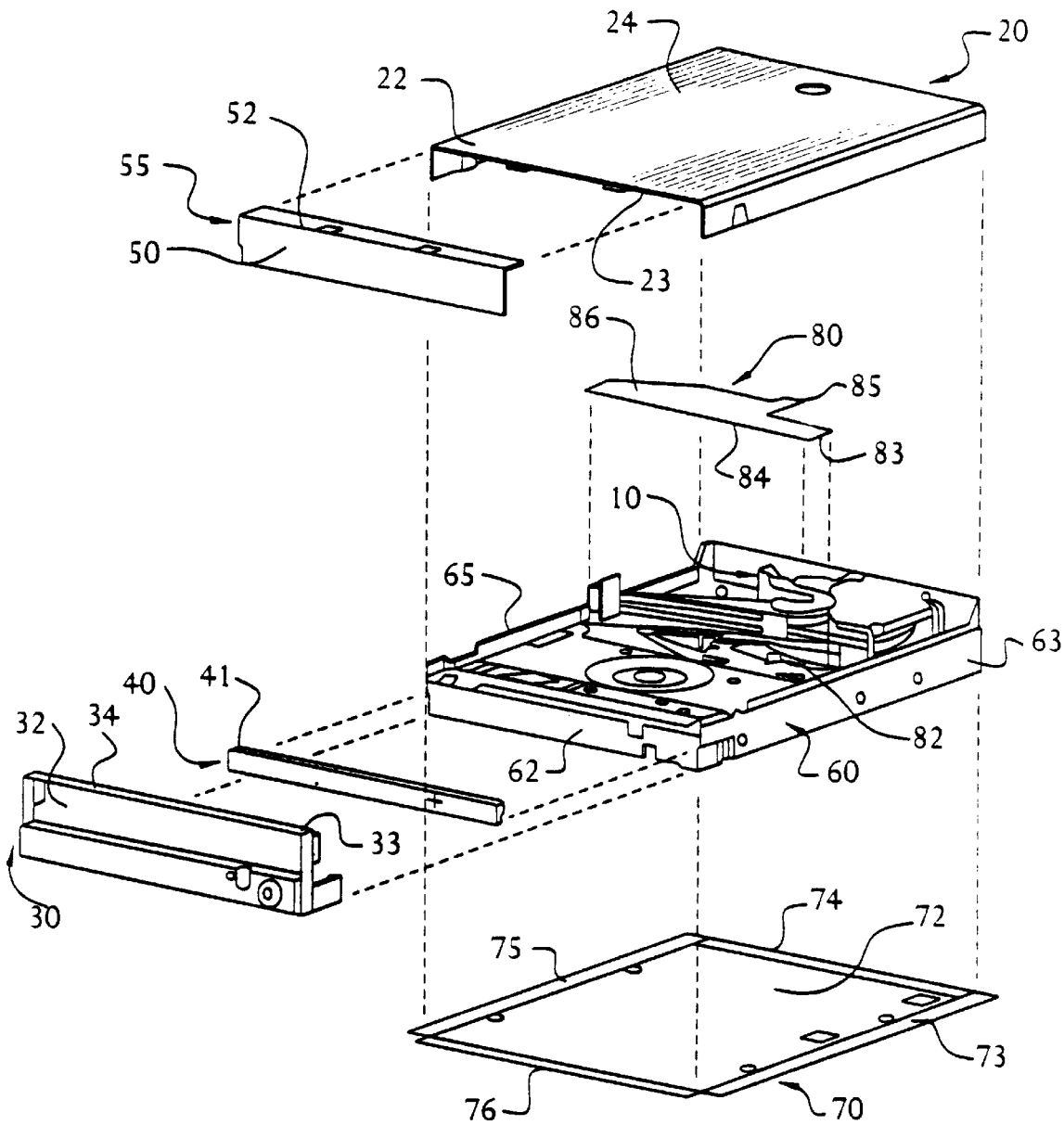
FIG. 1 is an exploded perspective view of a removable disk drive in accordance with a preferred embodiment of the present invention.

In accordance with the present invention, a removable disk drive (or media data storage drive) has improved protection from ambient contamination. The present invention incorporates several seals into an existing disk drive design to achieve protection from ambient contamination. Referring to the drawings, there is shown in FIG. 1 an exploded perspective view of a removable disk drive in accordance with a preferred embodiment of the present invention.

The removable disk drive comprises means 10 for driving a removable media, an enclosure 20 for covering a top surface of said driving means 10, a front panel 30 on said enclosure having an opening 32 for insertion and removal of the removable media, a first foam strip 40 located on the bottom of said opening, a door 50 for covering the opening 32, a hinge assembly 55 for housing the door 50, a chassis 60 on which the means 10 for driving the removable media is mounted and to which the enclosure 20 is attached, a first seal 70 attached at its four edges to the bottom of the chassis 60, and a second seal 80 situated over a cartridge eject and head locking mechanism 82.

The first foam strip 40 at the bottom of the opening 32 in the front panel 30 of the disk drive seals the opening 32 against contamination while the disk(s) are spinning and during insertion and removal of the media. The first foam strip 40 is located behind the front panel 30 and primarily below the opening 32, with only a top edge 41 of the foam strip 40 partially covering the opening 32. The disk drive has a door 50 normally closing the opening 32 to prevent contamination from entering the drive. The door 50 has a hinge 52 at the top thereof so that the door can be opened by sliding the media over the top edge 41 of the first foam strip 40 and into the drive.

Figure 2:
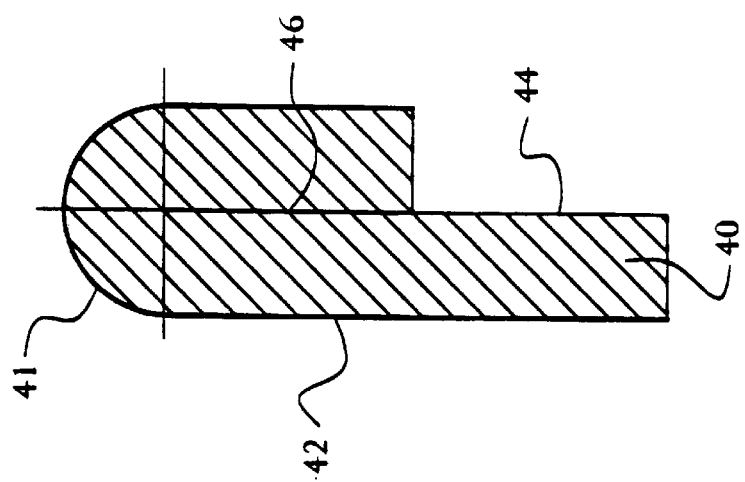
FIG. 2 is a cross-sectional view of a first foam strip according to the present invention.

FIG. 2 shows a cross-sectional view of the first foam strip 40, which is preferably approximately 1 mm. thick and made of polyester polyurethane foam manufactured by Fralock, a division of Lockwood Industries, Inc. A strip of plastic 42 over the foam strip 40 facilitates sliding the media over the top edge 41 of the strip of foam 40. The plastic strip 42, preferably polyethylene, covers one side of the foam strip 40. The other side of the foam strip 40 is covered with an adhesive 44. The first foam strip 40 is partially folded over itself, where one part of the side covered with adhesive 44 adheres to another part of the same side at the location denoted 46. The exposed portion of the side covered with adhesive 44 is used to affix the first foam strip 40 to the front face 62 of the disk drive.

Figure 3:
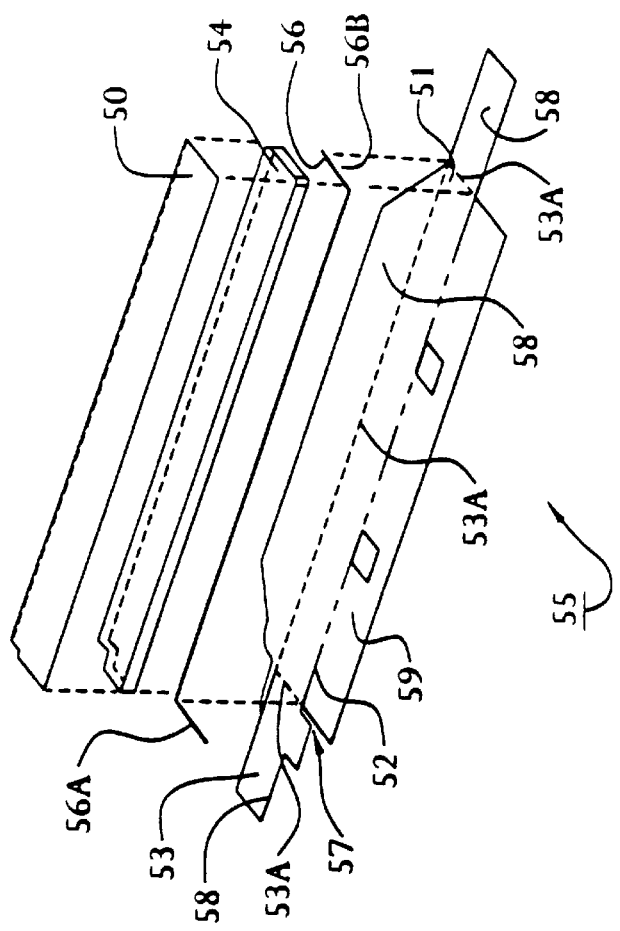
FIG. 3 is an exploded perspective view of a hinge assembly according to the present invention.

FIG. 3 shows an exploded perspective view of the hinge assembly 55. The assembly comprises a hinge frame 51, a spring 56, a second strip of foam 54, and a door 50. The hinge frame 51 is made of a flexible plastic material having adhesive on its inside surface 53 for holding all of the above components together. This combination makes up the hinge assembly 55.

After the spring 56 is placed on the hinge frame 51, the second foam strip 54, which is preferably approximately 2 mm. thick and made of polyester polyurethane foam, is placed on the frame 51. The door 50 is then placed over the second foam strip 54 and the adhesive surfaces 53 on tabs 58 of the hinge frame 51 are folded over the door 50 at creases 53A to hold the components together.

The door 50 is set off from tab 59 on the hinge frame 51 by the hinge 52. The tab 59 is affixed to the front 22 of the top surface 24 of the enclosure 20 by means of the adhesive. The front panel 30 is then placed in position, with the top rear edge 33 of the font panel 30 flush against the front edge 23 of the enclosure 20. An adhesive strip (not shown) is then placed over both the top surface 34 of the front panel 30 and the front 22 of the top surface 24 of the enclosure 20 so that the front panel 30 is affixed to the enclosure 20 and the door 50 covers the opening 32 of the front panel 30.

The spring 56 is used to bias the door 50 outwardly against the front panel 30. One end 56B of the spring 56 is embedded in one end of the door 50, while the other end 56A fits through a slot 57 in the hinge frame 51. End 56A of the spring 56 presses against the underside of the enclosure 20 at its front end 22 so that the door 50 is biased outwardly against the front panel 30, but can yield to insertion of the cartridge into the disk drive.

When the door is closed, the second foam strip 54 provides padding to the door 50 and allows it to seal the opening 32 of the front panel 30 better than without the foam strip 54, i.e., when the door 50 is flush against the front panel 30. In an embodiment of the disk drive where the door 50 remains open when a cartridge is inside the disk drive, the foam strip 54 presses against the top of the cartridge and seals the opening 30 of the front panel, thereby preventing external contamination from entering the drive.

Figure 4:
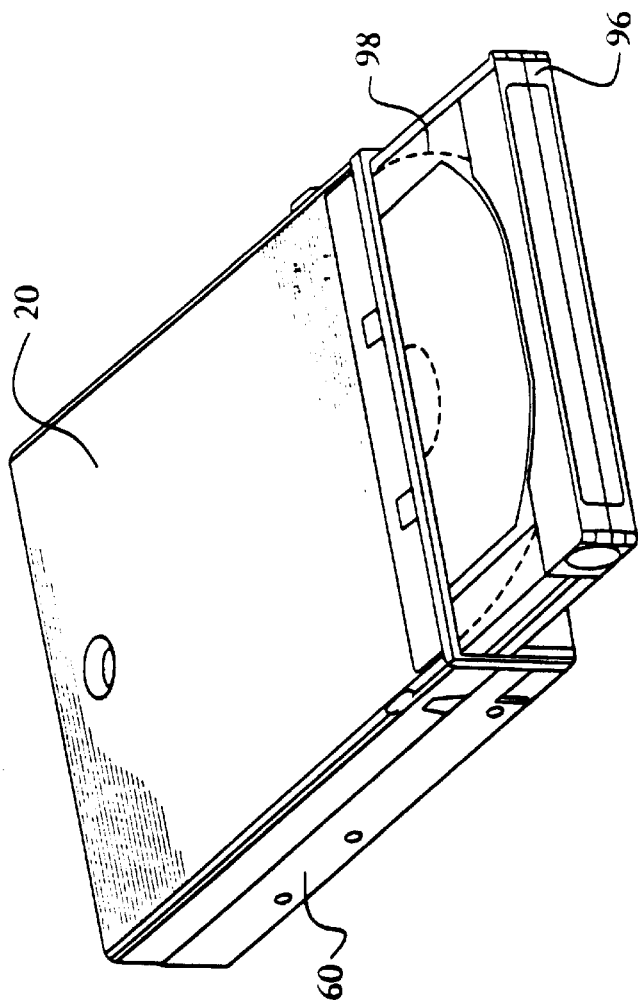
FIG. 4 is perspective view of a removable disk drive according to the present invention in cooperation with a cartridge.

FIG. 4 shows a perspective view of a removable disk drive according to the present invention in cooperation with a cartridge 96. Housed inside the cartridge 96 is a rotatable storage disk 98 (or disks), represented by dashed lines and upon which electronic information is stored.

Figure 5:
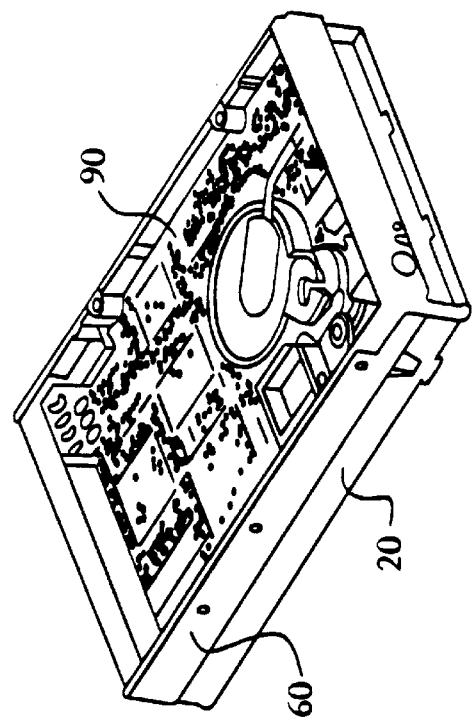
FIG. 5 is a perspective underside view of a removable disk drive according to the present invention.

In accordance with the present invention, the first seal 70 comprises a rectangular sheet 72 of plastic, preferably MYLAR® film, and adhesives 73, 74, 75 and 76 laminated on its four edges. These four bands of adhesives 73, 74, 75 and 76 are attached to the removable disk drive covering the entire bottom portion of the drive. Bands 73 and 75 fold up and adhere to the sides 63 and 65 of the drive, while bands 74 and 76 adhere directly to the bottom portion of the drive. FIG. 5 shows a perspective underside view of a removable disk drive, depicting where an electronic circuit board 90 for controlling the disk drive is located.

The first seal 70 performs two functions. The primary function is to prevent extrinsic contamination from entering the removable disk drive through the gaps and openings on the bottom of the drive. The first seal 70 acts as a barrier to blockade any airborne particles from being pulled into the negative pressurized areas of the removable disk drive. Another function of the first seal 70 is to prevent electrical contact of electrical components mounted on the circuit board 90 on the bottom of the removable disk drive. This helps prevent electrical shorting of any electrical components mounted on the circuit board 90.

Figure 6:
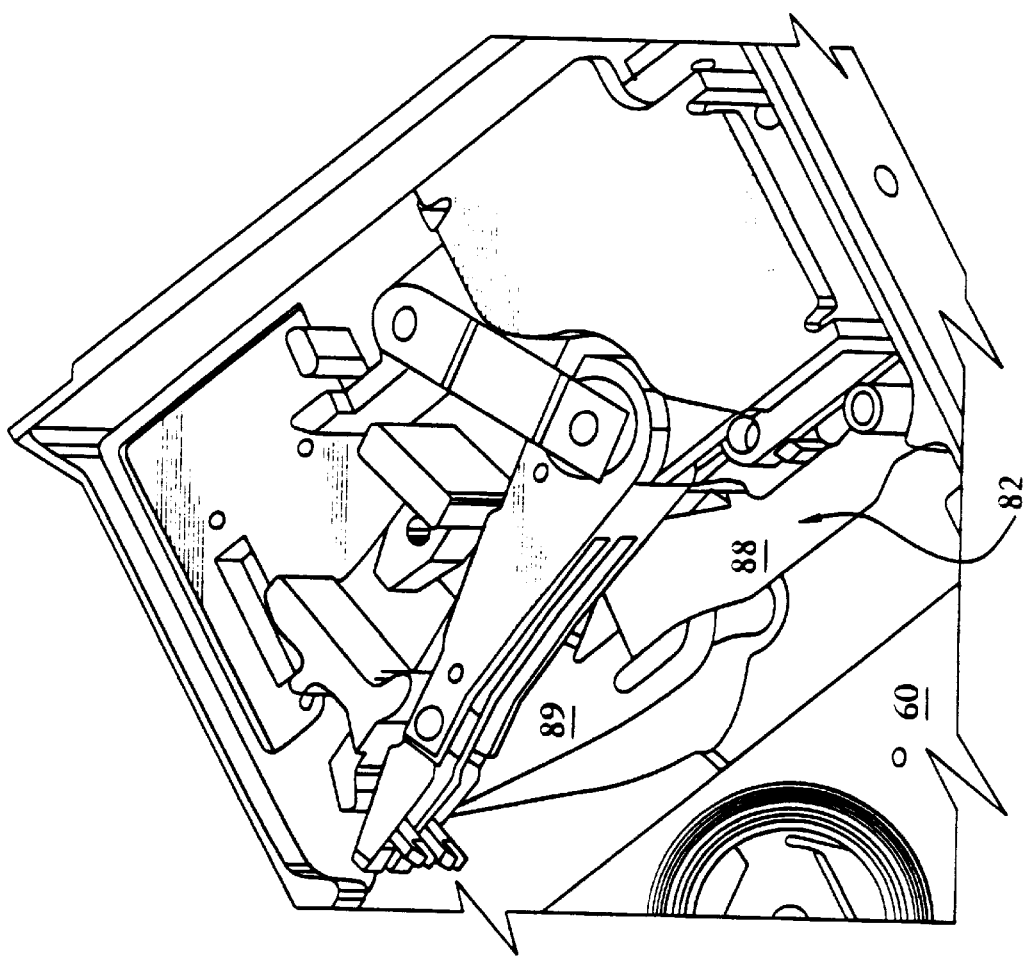
FIG. 6 shows the area of detail which is covered by the second seal 80.

In accordance with the present invention, the second seal 80 comprises a sheet 86 of plastic, preferably MYLAR® film, and adhesives 83, 84 and 85 laminated on three of its edges. These three bands of adhesives 83, 84 and 85 are attached directly to the chassis 60. FIG. 6 shows the area of detail which is covered by the second seal 80. The second seal 80 covers two levers 88 and 89 of the cartridge eject and head locking mechanism 82 of the disk drive in order to prevent contamination from entering the drive from these components.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

I claim:

1. A removable data storage drive for housing a removable media comprising:

means for driving said removable media, said means for driving including a cartridge eject and head locking mechanism;

a chassis on which said means for driving said removable media is mounted;

an enclosure attached to said chassis to cover a top surface of said means for driving;

a circuit board mounted to the bottom of said chassis; and a sheet of plastic over only said cartridge eject and head locking mechanism and situated between said top surface and said enclosure and attached to said chassis to prevent debris from entering said drive from said mechanism.

* * * * *